United States Patent
Zhang et al.

(10) Patent No.: US 10,612,810 B2
(45) Date of Patent: Apr. 7, 2020

(54) METHOD AND SYSTEM FOR CONTROLLING AIR CONDITIONER OUTDOOR UNIT

(71) Applicant: GREE ELECTRIC APPLIANCES, INC. OF ZHUHAI, Zhuhai, Guangdong (CN)

(72) Inventors: Xuefen Zhang, Guangdong (CN); Zhigang Zhao, Guangdong (CN); Peng Ren, Guangdong (CN); Shiyong Jiang, Guangdong (CN); Keqin Liu, Guangdong (CN); Chongyang Feng, Guangdong (CN); Jinrong Yuan, Guangdong (CN); Yingyi Jiang, Guangdong (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 180 days.

(21) Appl. No.: 15/526,693

(22) PCT Filed: Aug. 21, 2015

(86) PCT No.: PCT/CN2015/087848
§ 371 (c)(1),
(2) Date: May 12, 2017

(87) PCT Pub. No.: WO2016/145785
PCT Pub. Date: Sep. 22, 2016

(65) Prior Publication Data
US 2017/0314802 A1   Nov. 2, 2017

(30) Foreign Application Priority Data

Mar. 16, 2015 (CN) .......................... 2015 1 0115436

(51) Int. Cl.
F24F 11/77 (2018.01)
F24F 11/00 (2018.01)
(Continued)

(52) U.S. Cl.
CPC ................ *F24F 11/77* (2018.01); *F03D 9/25* (2016.05); *F24F 5/0046* (2013.01); *F24F 11/00* (2013.01);
(Continued)

(58) Field of Classification Search
CPC .. F24F 5/0046; F24F 2005/0067; F24F 11/61; F24F 11/77; F24F 11/62; F24F 11/79
See application file for complete search history.

(56) References Cited

U.S. PATENT DOCUMENTS

| | | | | |
|---|---|---|---|---|
| 5,724,826 A | * | 3/1998 | Han | F24F 1/06 62/183 |
| 5,913,890 A | * | 6/1999 | Lee | F24F 11/79 62/186 |

(Continued)

FOREIGN PATENT DOCUMENTS

| | | |
|---|---|---|
| CN | 2932188 Y | 8/2007 |
| CN | 102003223 A | 4/2011 |

(Continued)

OTHER PUBLICATIONS

European Patent Office, Supplementary European Search Report for EP 15885161.8, dated Jan. 17, 2018.

*Primary Examiner* — Nelson J Nieves
(74) *Attorney, Agent, or Firm* — Dragon Sun Law Firm, PC (57) ABSTRACT

A method for controlling an air conditioner outdoor unit comprises: acquiring the working mode of the air conditioner outdoor unit; acquiring sensor parameters of the air conditioner outdoor unit according to the working mode, the (Continued)

sensor parameters including wind direction parameters read by a wind direction sensor (163) or temperature parameters read by a temperature sensor (161); determining control parameters for the air conditioner outdoor unit by the working mode and the sensor parameters corresponding to the working mode; driving the rotating speed of a fan (121) and the rotating angle of a wind direction adjusting device (125) by use of the control parameters. In addition, a control system for the air conditioner outdoor unit is also related to.

18 Claims, 7 Drawing Sheets

(51) Int. Cl.
| | | |
|---|---|---|
| *F24F 11/30* | (2018.01) | |
| *F03D 9/25* | (2016.01) | |
| *F24F 11/62* | (2018.01) | |
| *F24F 11/79* | (2018.01) | |
| *F24F 5/00* | (2006.01) | |
| *F03D 9/00* | (2016.01) | |
| *F24F 140/60* | (2018.01) | |
| *F24F 110/32* | (2018.01) | |
| *F24F 110/10* | (2018.01) | |
| *F24F 110/12* | (2018.01) | |
| *F24F 11/61* | (2018.01) | |

(52) U.S. Cl.
CPC .............. *F24F 11/30* (2018.01); *F24F 11/62* (2018.01); *F24F 11/79* (2018.01); *F03D 9/00* (2013.01); *F24F 11/61* (2018.01); *F24F 2005/0067* (2013.01); *F24F 2110/10* (2018.01); *F24F 2110/12* (2018.01); *F24F 2110/32* (2018.01); *F24F 2140/60* (2018.01); *Y02E 10/725* (2013.01)

(56) References Cited

U.S. PATENT DOCUMENTS

| | | | | | |
|---|---|---|---|---|---|
| 8,074,460 | B2* | 12/2011 | Wang | ............... | F24F 5/0046 62/171 |
| 8,900,041 | B2* | 12/2014 | Toy | ............... | F04D 25/088 454/258 |
| 2004/0165986 | A1* | 8/2004 | Parker | ............... | F04D 29/164 415/220 |
| 2009/0013703 | A1* | 1/2009 | Werner | ............... | F24F 5/0046 62/180 |
| 2011/0174011 | A1* | 7/2011 | Kim | ............... | F04D 19/007 62/426 |
| 2012/0022702 | A1* | 1/2012 | Jang | ............... | F24F 12/006 700/277 |
| 2012/0036878 | A1* | 2/2012 | Bush | ............... | F24F 1/38 62/186 |
| 2012/0191253 | A1* | 7/2012 | Rockenfeller | ............... | F24F 3/00 700/276 |
| 2013/0220906 | A1* | 8/2013 | Stenhouse | ............... | E03B 3/28 210/181 |
| 2014/0099872 | A1* | 4/2014 | Matsumoto | ............... | F24F 11/43 454/229 |
| 2014/0214213 | A1* | 7/2014 | Rockenfeller | ............... | G05D 23/1923 700/276 |
| 2015/0267946 | A1* | 9/2015 | Lowstuter, Jr. | ............... | F25B 27/005 62/235.1 |
| 2015/0330693 | A1* | 11/2015 | Sykora | ............... | B60H 1/00428 62/115 |
| 2015/0338111 | A1* | 11/2015 | Havard | ............... | F24F 1/38 165/287 |
| 2015/0354887 | A1* | 12/2015 | Akiyama | ............... | F28B 1/06 62/613 |
| 2016/0282005 | A1* | 9/2016 | Kim | ............... | H02P 21/00 |
| 2016/0377312 | A1* | 12/2016 | Kojima | ............... | F24F 1/0003 165/247 |
| 2017/0219237 | A1* | 8/2017 | Hasegawa | ............... | F24F 11/77 |
| 2017/0284717 | A1* | 10/2017 | Suzuki | ............... | F24F 11/89 |
| 2018/0087797 | A1* | 3/2018 | Han | ............... | F24F 11/81 |

FOREIGN PATENT DOCUMENTS

| | | |
|---|---|---|
| CN | 201943894 U | 8/2011 |
| CN | 103438504 A | 12/2013 |
| CN | 203321746 U | 12/2013 |
| CN | 203756438 U | 8/2014 |
| CN | 104410343 A | 3/2015 |
| CN | 104633869 A | 5/2015 |
| CN | 204574366 U | 8/2015 |
| JP | 2001263767 A | 9/2001 |
| JP | 2005214496 A | 8/2005 |
| JP | 2011085336 A | 4/2011 |
| JP | 2011099597 A | 5/2011 |
| JP | 2011196584 A | 10/2011 |
| WO | 2013073930 A1 | 5/2013 |

\* cited by examiner

METHOD AND SYSTEM FOR CONTROLLING AIR CONDITIONER OUTDOOR UNIT

TECHNICAL FIELD

The present application relates to the field of air conditioning equipment, and particularly to a method and a system for controlling an air conditioner outdoor unit.

BACKGROUND ART

Currently, the demand for environmental protection and energy saving is getting stronger, so that air conditioner manufacturers of both household air conditioners and light commercial air conditioners turn more attention to supplying power to the air conditioner with new energy sources after the development stage of completing frequency conversion of the air conditioner to improve the efficiency of the air conditioner itself, so as to achieve an object of further energy saving and emission reduction.

Photovoltaic air conditioners and other new energy air conditioners are gradually available in the market, among which the air conditioners with power generated by breeze are gradually concerned due to their characteristics of substantially requiring no additional cost or great change to the existing structure. However, since such air conditioner with power generated by wind is restricted by a mounting position of an air conditioner outdoor unit and so on, when the air conditioner is in a working mode of power generation, electrical energy which can be supplied is relatively little.

An effective solution has not yet been put forward to the problem of a low utilization ratio of wind energy caused by the fact that a position of a fan of an air conditioner outdoor unit cannot be changed as required in the prior art.

DISCLOSURE OF THE INVENTION

A main object of the present invention is to provide a method and a system for controlling an air conditioner outdoor unit so as to solve the problem of a low utilization ratio of wind energy caused by the fact that a position of a fan of an air conditioner outdoor unit cannot be changed as required in the prior art.

In order to realize the above object, according to one aspect of an example of the present invention, a method for controlling an air conditioner outdoor unit is provided. The method comprises: acquiring a working mode of the air conditioner outdoor unit; acquiring sensor parameters of the air conditioner outdoor unit according to the working mode, wherein the sensor parameters include wind direction parameters read by a wind direction sensor or temperature parameters read by a temperature sensor; determining control parameters for the air conditioner outdoor unit by the working mode and the sensor parameters corresponding to the working mode; driving a rotating speed of a fan and a rotating angle of a wind direction adjusting device using the control parameters.

In order to realize the above object, according to another aspect of an example of the present invention, a system for controlling an air conditioner outdoor unit is provided. The system comprises: an energy source conversion device for performing conversion between an alternating current and a direct current; a fan device connected with the energy source conversion device through a direct current bus; a compressor device connected with the energy source conversion device through the direct current bus; a sensor for sensing and obtaining sensor parameters of the air conditioner outdoor unit; a controller establishing communication connection respectively with the energy source conversion device, the fan device, the compressor device, and the sensor, and used for acquiring the working mode of the air conditioner outdoor unit and acquiring the sensor parameters of the air conditioner outdoor unit according to the working mode, and determining control parameters for the air conditioner outdoor unit by the working mode and the sensor parameters corresponding to the working mode; driving a rotating speed of a fan and a rotating angle of a wind direction adjusting device using the control parameters.

According to examples of the invention, by acquiring the working mode of the air conditioner outdoor unit; acquiring the sensor parameters of the air conditioner outdoor unit according to the working mode, wherein the sensor parameters include wind direction parameters read by the wind direction sensor or the temperature parameters read by the temperature sensor; determining control parameters for the air conditioner outdoor unit by the working mode and the sensor parameters corresponding to the working mode; driving the rotating speed of the fan and the rotating angle of the wind direction adjusting device using the control parameters, the problem of the low utilization ratio of wind energy caused by the fact that the position of the fan of the air conditioner outdoor unit cannot be changed as required in the prior art is solved, and the effects of adjusting an orientation of a vent of the air conditioner outdoor unit according to the wind direction and improving the utilization ratio of using the wind energy are reached.

BRIEF DESCRIPTION OF DRAWINGS

The drawings constituting a portion of the present application are used for further understanding of the present application. Illustrative examples of the present application and description thereof are used to explain the present application, rather than improperly limiting the present application. In the figures.

DETAILED DESCRIPTION OF EMBODIMENTS

It should be indicated that examples of the present application and features in the examples can be combined with each other without conflict. The present application will be described in detail with reference to the figures in conjunction with the examples.

In order to make a person skilled in the art better understand solutions of the present application, below technical solutions of the examples of the present application will be described clearly and completely in conjunction with the figures of the examples of the present application. Apparently, some but not all of examples of the present application are described. Based on the examples of the present application, all the other examples, which a person ordinarily skilled in the art obtains without paying inventive effort, fall within the scope of protection of the present application.

It should be indicated that terms "first", "second" and so on in the description, the claims and the above figures of the present application are used to distinguish similar objects, but are not necessarily used to describe a specific order or sequence. It should be understood that thus used terms can be exchanged when appropriate so as to facilitate the examples of the present application described herein. Besides, terms "comprising" and "having" and any of their variants are intended to cover non-exclusive containing, for example, a process, a method, a system, a product or a device containing a series of steps or units is not necessarily limited to clearly listing those steps or units, but may include other steps or units which are not clearly listed or inherent to the process, method, product or device.

Example 1

Figure 1:
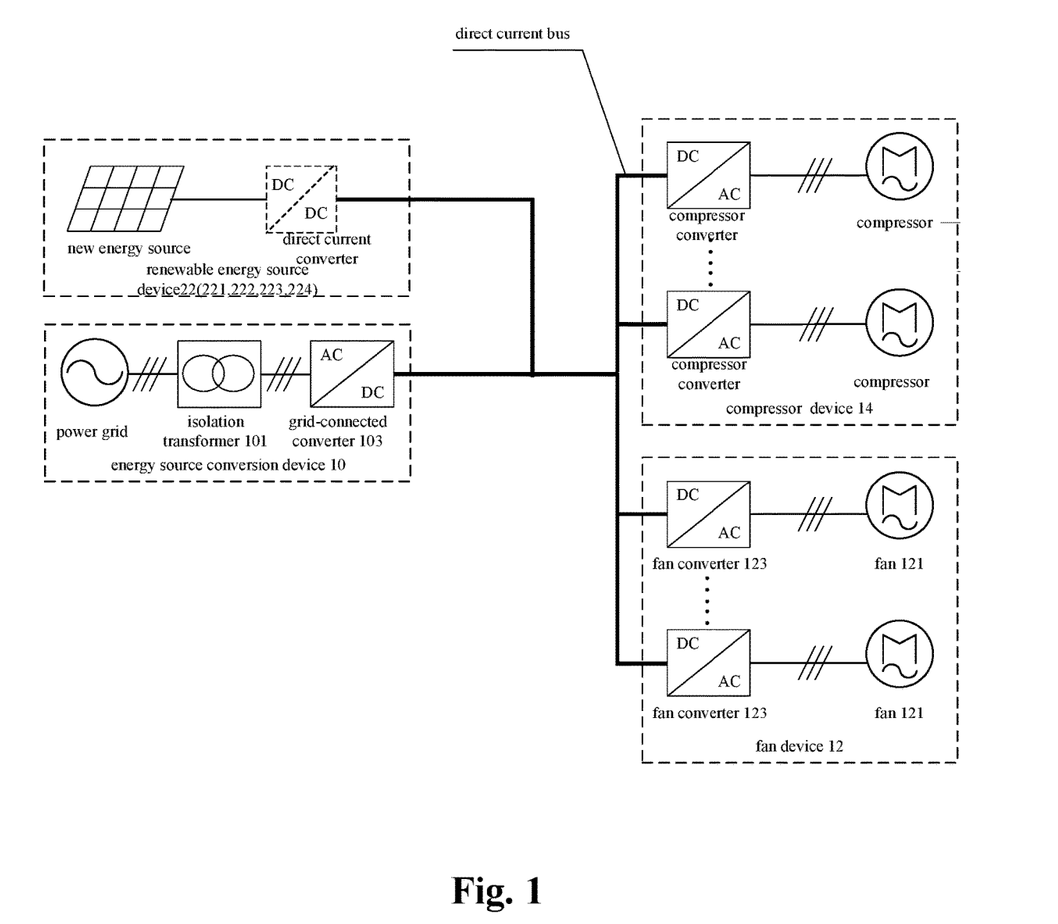
FIG. 1 is a system structure view of an air conditioner outdoor unit according to an example of the present application.

FIG. 1 is a system structure view of an air conditioner outdoor unit using a system for controlling an air conditioner outdoor unit according to an example of the present application. The system for controlling an air conditioner outdoor unit is described in detail according to the system structure view of the air conditioner outdoor unit.

In a most basic configuration thereof, an example of the present application provides a system for controlling an air conditioner outdoor unit.

Figure 5:
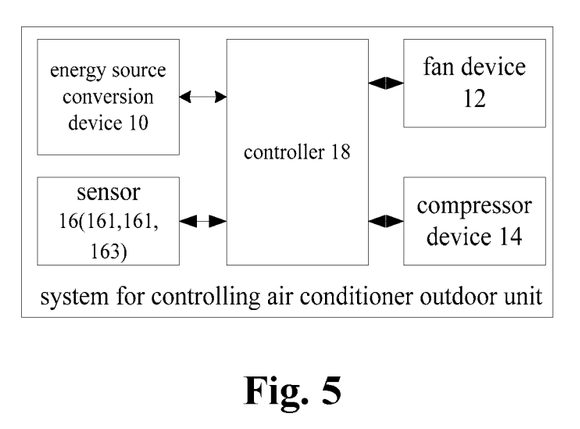
FIG. 5 is a system block diagram of a system for controlling an air conditioner outdoor unit according to Example 1 of the present application.

As shown in FIG. 5, FIG. 5 is a system structure diagram of an air conditioner outdoor unit system according to an example of the present application. The air conditioner outdoor unit comprises: an energy source conversion device 10, a fan device 12, a compressor device 14, a sensor 16 and a controller 18.

Thereinto, the energy source conversion device 10 is used to perform conversion between an alternating current and a direct current; the fan device 12 is connected with the energy source conversion device 10 through a direct current bus; the compressor device 14 is connected with the energy source conversion device 10 through the direct current bus; the sensor 16 is provided on the air conditioner outdoor unit; the controller 18 establishes communication connection respectively with the energy source conversion device 10, the fan device 12, the compressor device 14, and the sensor 16, and is used for acquiring a working mode of the air conditioner outdoor unit; acquiring sensor parameters of the air conditioner outdoor unit according to the working mode; determining control parameters for the air conditioner outdoor unit by the working mode and the sensor parameters corresponding to the working mode; driving a rotating speed of a fan and a rotating angle of a wind direction adjusting device using the control parameters.

In the solution of the above example of the present application, the sensor parameters corresponding to the working mode are collected according to the working mode of the air conditioner outdoor unit through the energy source conversion device 10, the fan device 12, the compressor device 14, the sensor 16 and the controller 18 mentioned above, wherein the working mode at least contains a power consumption mode and a power generation mode. The direct current bus is a transmission medium for connecting electrical components, namely, the energy source conversion device 10, the fan device 12 and the compressor device 14 and transmitting direct current electrical energy.

When the air conditioner outdoor unit is in the power consumption mode, the controller reads a numerical value of temperature of a temperature sensor provided inside the air conditioner outdoor unit, and can control the air conditioner outdoor unit to adjust the rotating speed of the fan according to changes of an actual temperature inside the air conditioner. This not only satisfies requirements for heat dissipation, but also can achieve an object of saving energy and power.

When the air conditioner outdoor unit is in the power generation mode, the controller reads the wind direction parameters of the wind direction sensor provided outside the air conditioner outdoor unit, and can control the air conditioner outdoor unit to adjust the wind direction adjusting device according to an actual wind direction outside the air conditioner, so that air can exchange inside and outside the outdoor unit, thereby making use of flow of air as much as possible to drive the fan to rotate. Thus, the efficiency of generating power using the fan is improved.

Preferably, the energy source conversion device 10 in the above example of the present application may comprise: an isolation transformer 101, and a grid-connected converter 103.

Thereinto, the isolation transformer 101 establishes connection with a power grid; the grid-connected converter 103 is connected respectively with the direct current bus and the isolation transformer 101.

Figure 6:
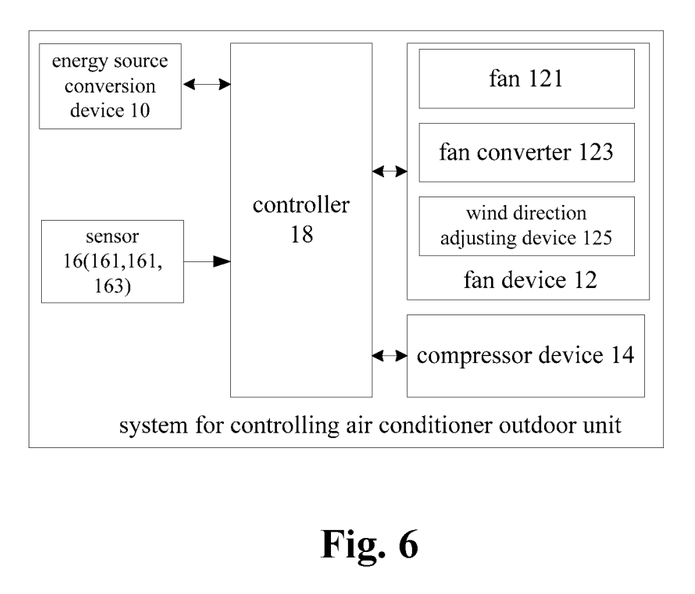
FIG. 6 is a system block diagram of a preferred system for controlling an air conditioner outdoor unit according to Example 1 of the present application.

It can be seen in conjunction with FIG. 6 that the energy source conversion device 10 provided above may comprise an isolation transformer and a grid-connected converter. An alternating current from the power grid and the direct current in the air conditioner outdoor unit can be mutually converted through the isolation transformer and the grid-connected converter.

When the air conditioner outdoor unit is in the power consumption mode, the alternating current transmitted by the power grid can be changed into direct current through the energy source conversion device, which comprises the isolation transformer and the grid-connected converter, and delivered to the direct current bus.

When the air conditioner outdoor unit is in the power generation mode, recovery and grid-connection can be performed on energy in a boosting manner or using a staggered modulation technology (the staggered modulation technology refers to a modulation technology of performing staggered amplitude modulation and pulse width modulation on a direct voltage under a condition of a wide bus voltage range so as to ensure that the direct voltage can satisfy a driving voltage for motor operation after undergoing the modulation) through the energy source conversion device comprising the isolation transformer and the grid-connected converter.

Preferably, in the above example of the present application, the fan device 12 comprises: a fan 121, a fan converter 123, and a wind direction adjusting device 125.

Thereinto, in the power consumption mode, by performing an inversion processing on the direct current through the fan converter 123, the fan 121 is driven to rotate actively in forward direction to drive air flow for performing heat dissipation for the inside of the air conditioner outdoor unit, and a direction of air flow for the heat dissipation is changed with the help of the wind direction adjusting device 125.

In the power generation mode, the power is generated through reverse rotation of the fan 121 driven by the air flow; and the generated electrical energy is rectified by the fan converter 123 into a direct current, and the wind direction adjusting device 125 is used to adjust a direction of air flow entering the fan according to the wind direction.

Thereinto, a manner of realizing the adjustment of the direction of the air flow entering the fan according to the wind direction by wind direction adjusting device 125, can be changing the direction of the air flow entering the air conditioner outdoor unit by providing a wind direction deflector inside and/or outside the fan 121; or can be changing the direction of the air flow entering the air conditioner outdoor unit by changing a working angle of the whole fan 121 by providing rotation shafts in two (vertical and/or horizontal) axial directions of the fan.

Through the above example, the problem of a low utilization ratio of the wind energy caused by the fact that the position of the fan of the air conditioner outdoor unit cannot be changed as required in the prior art is solved, and the effects of adjusting the orientation of the vent of the air conditioner outdoor unit according to the wind direction and improving the utilization ratio of using the wind energy are reached.

Preferably, in the above example of the present application, the sensor 16 comprises: at least one temperature sensor 161.

Thereinto, the temperature sensor 161 is mounted inside the air conditioner outdoor unit, and establishes communication connection with the controller 18, and is used to read a temperature value inside the air conditioner outdoor unit.

Specifically, the controller determines a first control parameter for controlling a rotating speed value of the fan by acquiring an actual power value of a compressor of the air conditioner outdoor unit and comparing the actual power value of the compressor with a rated power value of the compressor, so as to realize hierarchical control of the fan of the compressor.

In practical application, when the air conditioner outdoor unit works in the power consumption mode, the fan converter DC/AC (Direct Current-to-Alternating Current) works in an inversion state, and the fan rotates forwardly to perform heat dissipation for the air conditioner outdoor unit;

when the compressor of the air conditioner works under a maximum load, the controller controls the fan to output a maximum heat dissipation capability in synchronization so as to provide a heat dissipation capability matched with module heat dissipation requirements at this moment.

When the compressor works under conditions of other loads, heat dissipation requirements of an inverter module of the compressor are different from requirements of the compressor) during operation at a rated power. The controller adjusts a rotating speed $\omega_f = f(T_{mod}, P_{com})$ of the fan according to an actual temperature value $T_{mod}$ read by the temperature sensor and a compressor working power $P_{com}$, so as to realize the matching of the heat dissipation capability output by the fan with the heat dissipation capability required by the inside of the air conditioner outdoor unit.

Further, the rotating speed of the fan can be adjusted through a calculation formula as follows:

$$\omega_f = K^*(a^*P_{com} + b^*\text{Table}(T_{mod}, P_{ref}));$$

wherein, a and b are weighted coefficients, which are variable values; $K = k_1 * \omega_n / P_n$, $\omega_n$ is the rated rotating speed, $P_n$ is the rated power, $k_1$ is a weighted coefficient; Table $(T_{mod}, P_{ref})$ is a preset table (modifiable according to an empirical value) of temperatures and powers under different working conditions.

A power output of the fan is adjusted according to a temperature value obtained by reading the temperature sensor so that the power output of the fan is matched with the requirements for heat dissipation. When the temperature is relatively low, and when the temperature inside the air conditioner outdoor unit is relatively low, the rotating speed of the fan is adjusted to slow down; when the temperature inside the air conditioner outdoor unit is relatively high, the heat dissipation requirements inside the air conditioner outdoor unit are increased, the rotating speed of the fan is adjusted to become faster so as to reduce the consumption of energy while meeting the heat dissipation capability and realize hierarchical heat dissipation.

Through linkage control of the controller to the fan and the temperature inside the air conditioner outdoor unit, excessive consumption of electrical energy caused by the fan, which keeps dissipating heat at maximum power, is prevented, meanwhile the service life of the fan also can be prolonged.

Further, when the air conditioner outdoor unit at least comprises two temperature sensors, the temperature sensors establish communication connection with the controller respectively, and the temperature sensors are mounted in different positions in the air conditioner outdoor unit, in a situation that the controller controls the rotating speed of the fan of the air conditioner outdoor unit according to the actual temperature inside the air conditioner outdoor unit, by further comparing the actual temperature values of at least two temperature sensors provided in different positions inside the air conditioner outdoor unit, an area having a relatively high temperature inside the air conditioner outdoor unit is determined. By adjusting the rotating angle of the wind direction adjusting device, heat dissipation is realized preferentially in area with higher temperature inside the air conditioner outdoor unit.

In practical application, through the method of the above example, apart from performing the linkage control to the actual rotating speed of the fan and the temperature inside the air conditioner outdoor unit, the controller further performs linkage control to the rotating direction of the wind direction adjusting device and area with highest temperature in the air conditioner outdoor unit to adjust an angle of inlet/outlet wind of the fan in real time so that quick heat dissipation is performed for the inside of the air conditioner outdoor unit and actual temperatures of various areas are balanced.

When the temperature inside the air conditioner outdoor unit is unbalanced, the rotating angle value of the wind direction adjusting device is controlled by $\theta_f = f(T_{env\_max}, T_{env\_1}, \ldots, T_{env\_n})$, and a specific rotating angle value $\theta_f$ depends on a highest temperature point inside the air conditioner outdoor unit, wherein $T_{env\_1}, T_{env\_2}, \ldots, T_{env\_n}$ are actual temperatures of respective temperature sensors.

Further, when the temperature inside the air conditioner outdoor unit is unbalanced, the wind direction can be adjusted by a calculation formula as follows:

$$\theta_f = K^*\text{Table}(\text{coordinate}(T_{env\_max}), \theta_{ref});$$

wherein, K is a weighted coefficient, which is a variable value; $T_{env\_max} = \text{Max}(T_{env\_1}, T_{env\_2}, \ldots, T_{env\_n})$, $T_{env\_1}$, $T_{env\_2}, \ldots, T_{env\_n}$ are actual temperatures of respective temperature sensors; $\theta_{ref}$ is a fixed angle value, the fixed angle value is the numerical value of predetermined angle of respective position point with respect to the fan.

Through the above method, according to the detection by the existing temperature sensor inside the air conditioner outdoor unit, a highest point of the temperature inside the air conditioner outdoor unit is determined, and the angle of the fan is adjusted, so that a wind outlet point of the fan is matched with the position with the highest temperature point inside the air conditioner outdoor unit, and the effect of quick heat dissipation is achieved, meanwhile a temperature field inside the air conditioner outdoor unit is maintained relatively balanced.

Preferably, in the above example of the present application, the sensor 16 comprises: a wind direction sensor 163.

Thereinto, the wind direction sensor 163 is mounted outside the air conditioner outdoor unit, and establishes communication connection with the controller 18 for acquiring wind direction information.

Specifically, the controller reads the wind direction parameters of the air conditioner outdoor unit. A rotating angle value by which the wind direction adjusting device needs to rotate is calculated according to the wind direction parameters, and a second control parameter for controlling the rotating angle of the adjusting device is generated according to the rotating angle value.

In practical application, a windward angle of the fan is adjusted according to the wind direction outside the air conditioner outdoor unit so that the fan angle is matched with the wind direction, and it is an optimal power generation angle, so as to improve the power generation efficiency of the fan.

Preferably, in the above example of the present application, the system further comprises: an energy storing unit 20.

Figure 7:
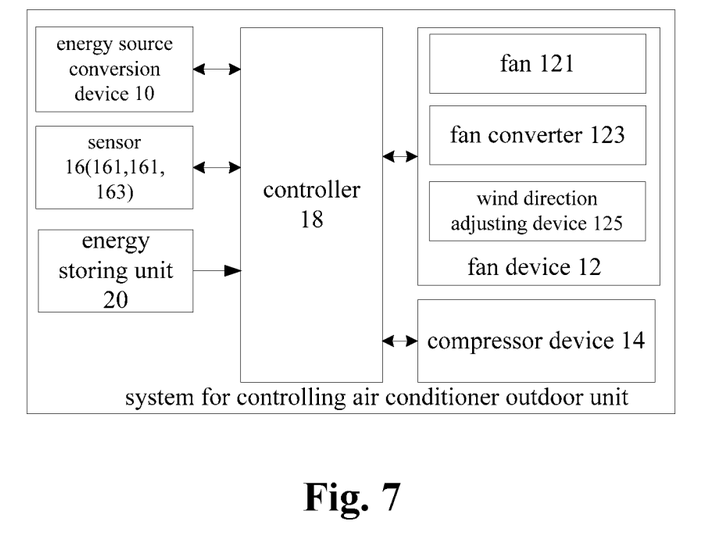
FIG. 7 is a system block diagram of a preferred system for controlling an air conditioner outdoor unit according to Example 1 of the present application.
Figure 8:
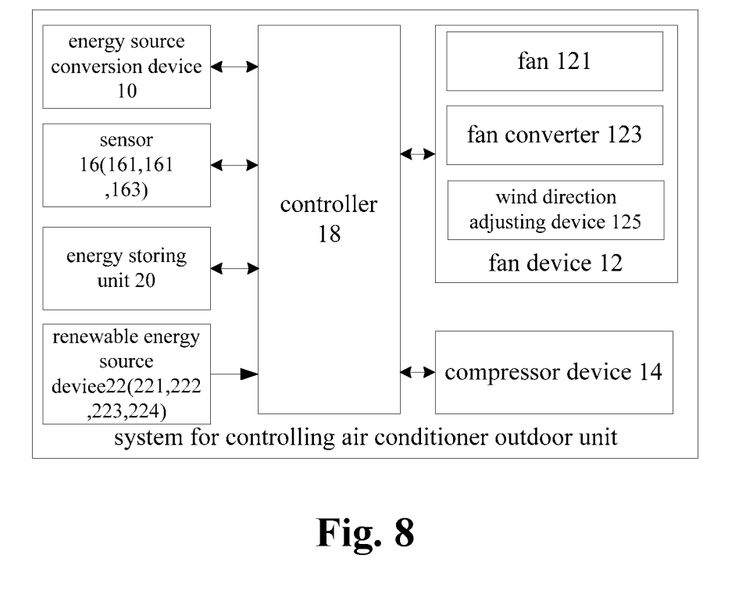
FIG. 8 is a system block diagram of a preferred system for controlling an air conditioner outdoor unit according to Example 1 of the present application.

As shown in FIG. 7, the energy storing unit 20 establishes connection with the direct current bus and is used to store the electrical energy generated by the fan device in the power generation mode.

Figure 2:
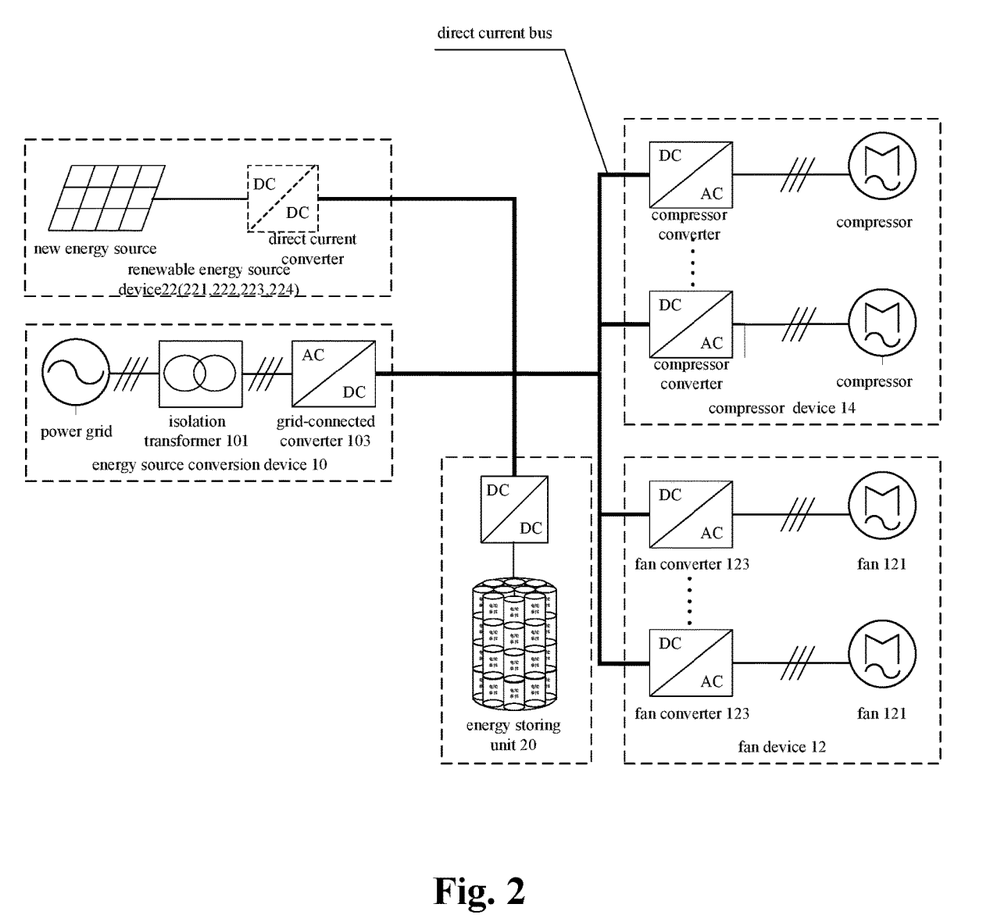
FIG. 2 is a system structure view of an optional air conditioner outdoor unit according to an example of the present application.

Specifically, in conjunction with that shown in FIG. 2, in the power consumption mode, the controller can divide 24 hours of each day, and can divide them into several time intervals as required. According to characteristics of each time interval, power consumption solutions corresponding to the time intervals are set up, wherein the power consumption solutions at least include: using the electrical energy of the power grid, using the electrical energy of the energy storing unit, and simultaneously using the electrical energy of the power grid and the energy storing unit.

When the air conditioner outdoor unit is in the power consumption mode, the controller determines the power consumption solution which should be used at current time according to the acquired current time and by matching the current time with a preset time interval.

In practical application, when remaining energy sources of the energy storing unit are relatively abundant, the power consumption solution can be adjusted according to the time interval so as to realize peak shifting and peak shaving operation and provide certain guarantee for the power grid security.

In the power generation mode, the generated power of the fan is read by the controller, and the read generated power of the fan is compared with a preset power threshold, so that a strategy of power recovery is adjusted according to the generated power of the fan, to realize maximum utilization of the recovered energy sources.

Further, when the air conditioner outdoor unit works in the power generation mode, the fan rotates reversely to generate power, the fan converter performs rectification (when the fan converter is a quadrant converter, the fan converter works in a rectification state) with a freewheel diode to obtain direct current, and the energy generated by the power generation through the reverse rotation of the fan can be hierarchically recovered in several manners as follows:

when the energy of the reverse rotation of the fan is less than a preset threshold, the energy charges the energy storing unit by the Direct Current-to-Direct Current (DC/DC) converter used for voltage stabilization in an energy storing step, to recycle the reverse energy in a storing way.

when the energy of the reverse rotation of the fan is greater than the preset threshold, it means that the energy generated by the power generation of the fan achieves a grid-connected condition, and grid connection is performed through the grid-connected converter and the isolation transformer (the isolation transformer can be optionally mounted according to a degree of stability of electrical energy conversion) for use by other loads in the power grid;

when the energy generated by the reverse rotation of the fan gets close to the grid-connected condition, recovery and grid connection are performed on the energy in a boosting manner or by a staggered modulation technology (the staggered modulation technology refers to a modulation technology of performing staggered amplitude modulation and pulse width modulation on a direct voltage under a condition of a wide bus voltage range, so as to ensure that the direct voltage can satisfy a driving voltage for motor operation after undergoing the modulation) and so on.

By comparing the generated power with the preset threshold, when power and voltage of wind power generation are less than the preset thresholds, the fan rotates reversely to generate power, and reversely rectifies the electrical energy it generates through a direct current/alternating current (DC/AC) converter of the fan itself of the air conditioner outdoor unit to obtain the direct current, and then charges the energy storing unit, improving the energy recovery rate of the reverse energy generation of the fan; at the same time, the energy storing unit can release energy to the direct current bus of the air conditioner when needed by the air conditioner, and the energy is converted by the compressor converter for use by the air conditioner, improving a direct utilization ratio of the energy of the power generated by the fan.

When the power and voltage of wind power generation are greater than certain set thresholds, and when the energy of the power generated through the reverse rotation of the fan facilitates the grid connection (when a boosting step is not needed or a capacity of the boosting step is relatively small), the power generated through the reverse rotation of the fan is reversely rectified by the DC/AC converter of a driving portion of the fan itself outside the air conditioner to obtain the direct current, which is combined to the direct current bus of the air conditioner, and fed back to the power grid through the grid-connected converter DC/AC to be used by other loads in the network, thus reducing a power picking amount from a mains supply, reducing a load of the power grid, and ensuring security of the power grid.

Preferably, in combination with that shown in FIG. 2, in the above example of the present application, the system further comprises: a renewable energy source device 22.

As shown in FIG. 2, the renewable energy source device 22 establishes a connection relationship with the direct current bus.

Specifically, in order to make operation of an air conditioner system more energy-saving and environmentally friendly, other renewable energy source devices can be added to the air conditioner outdoor unit so that the air conditioner outdoor unit is as much self-sufficient as possible in the power consumption mode, and a degree of dependence on the power grid is reduced.

Figure 3:
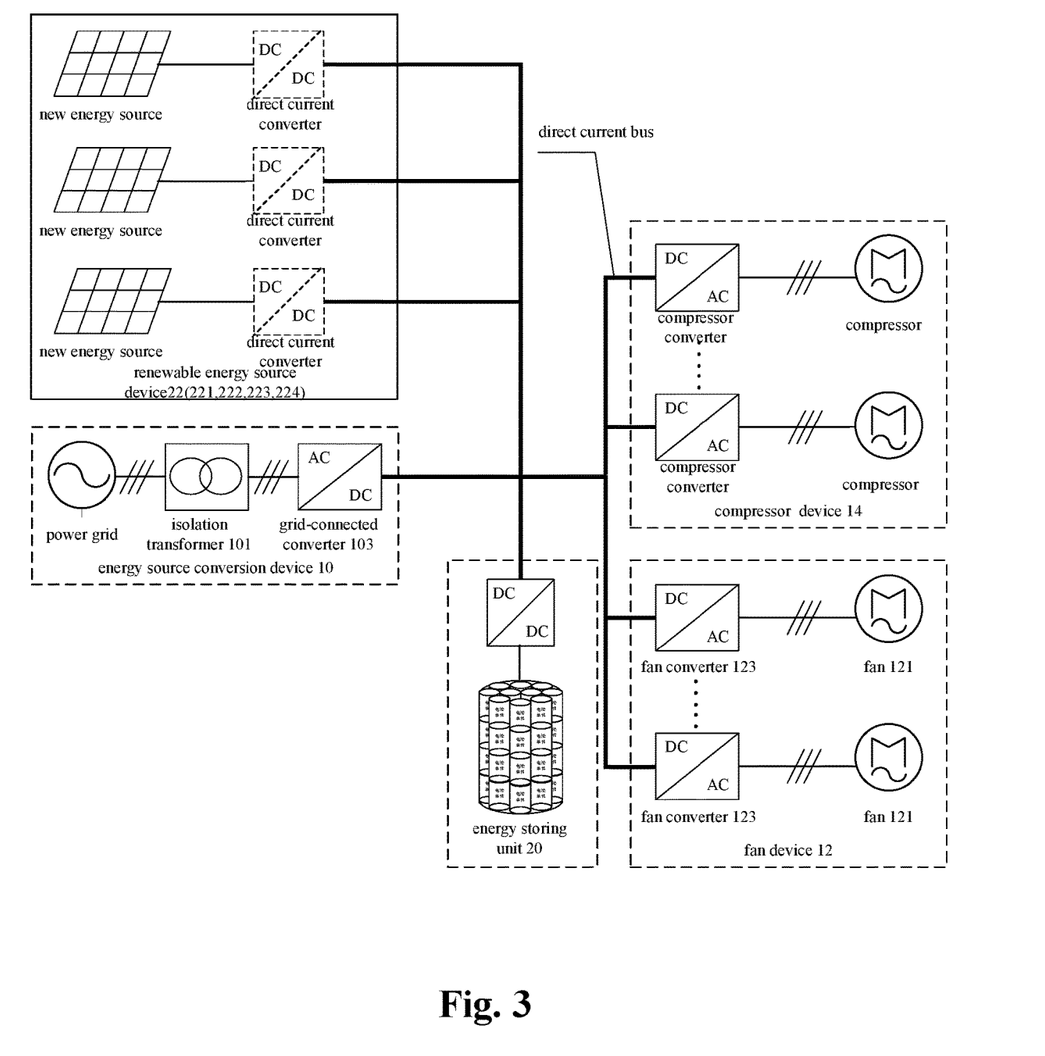
FIG. 3 is a system structure view of an optional air conditioner outdoor unit according to an example of the present application.

Preferably, as shown in FIG. 3, in the above example of the present application, the renewable energy source device 22 comprises any one or more devices as follows: a photovoltaic power generation device 221, a geothermal power generation device 222, a bioenergy power generation device 223 and a tidal power generation device 224.

Figure 4:
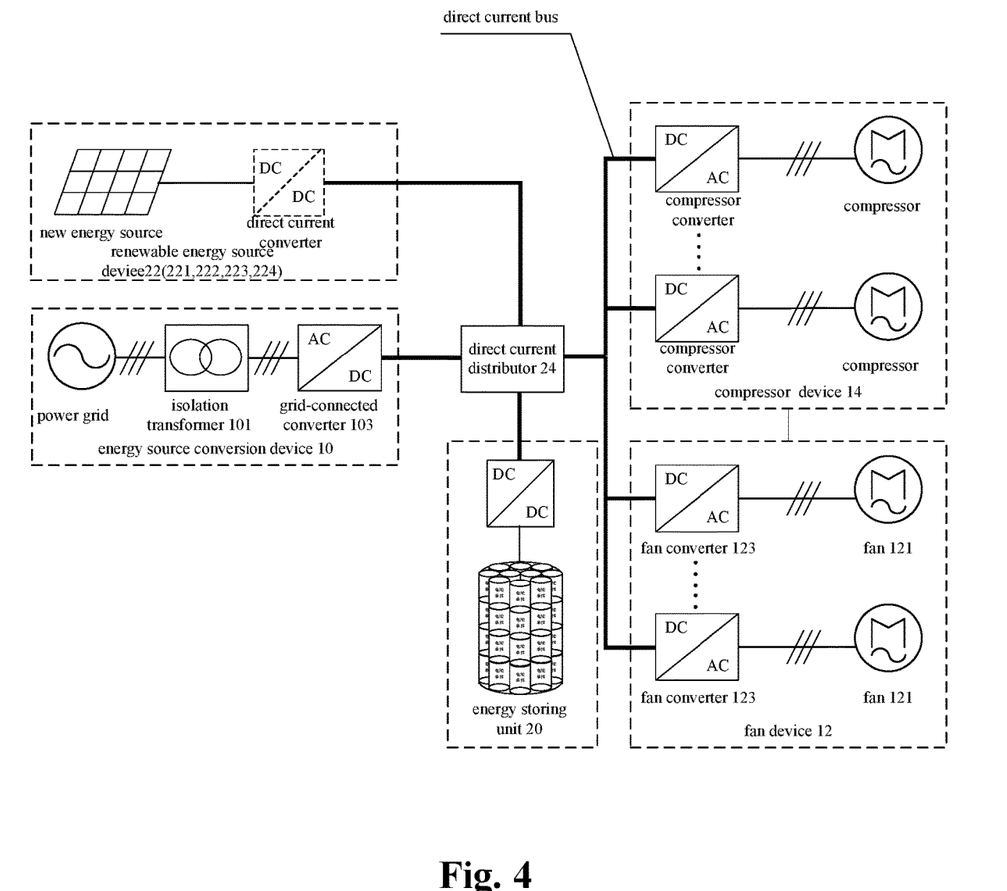
FIG. 4 is a system structure view of an optional air conditioner outdoor unit according to an example of the present application.

Preferably, as shown in FIG. 4, in the above example of the present application, the system further comprises: a direct current distributor 24, connected respectively with the energy source conversion device 10, the fan device 12, the compressor device 14, the renewable energy source device 22, the energy storing unit 20 and the controller 18, and used to generate energy source distribution instructions for the fan device 12, the compressor device 14 and the energy source conversion device 10 according to control instructions of the controller 18.

Specifically, the direct current distributor can perform a function of energy distribution on the direct current load so that the controller generates the distribution instructions for the energy sources through the direct current distributor after the power recovery strategy and the power consumption solution are determined. Of course, in a system for controlling the air conditioner outdoor unit without a direct current distributor, the system can directly distribute the energy through a grid-connected converter.

Further, the controller also can acquire the energy value of the energy storing unit before the step of determining the power recovery strategy by comparing the generated power of the fan in the power generation mode and the preset power threshold. The magnitude of the energy value is judged. When the energy value in the energy storing unit is less than or equal to the preset threshold, the energy storing module is charged.

Specifically, in the power generation mode, before determining the power recovery strategy, the energy value in the energy storing unit can be firstly judged. When the energy value in the energy storing unit is less than the preset threshold, the energy storing unit is preferentially charged so as to ensure a sufficient amount of power in the energy storing unit.

In practice, when the air conditioner outdoor unit works in the power consumption mode, firstly it is ensured that the energy storing unit has a sufficient amount of power, then when the power grid is in a period of peak load operation, the energy storing unit can preferentially release the stored energy to the direct current bus of the air conditioner, and the power is supplied through the compressor converter so as to achieve peak shifting and peak shaving operation, meanwhile the direct utilization ratio of the energy of the reverse rotation of the fan is improved.

The system for controlling an air conditioner outdoor unit put forward in the above example improves the efficiency of converting the wind energy into the electrical energy with the structure staying as much unchanged as possible, meanwhile during the heat dissipation for the air conditioner, the rotation speed of the fan is linked with the actual temperature inside the air conditioner outdoor unit for heat dissipation, reducing the energy consumption in the power consumption mode.

Example 2

An example of the present application provides a method for controlling an air conditioner outdoor unit.

Figure 9:
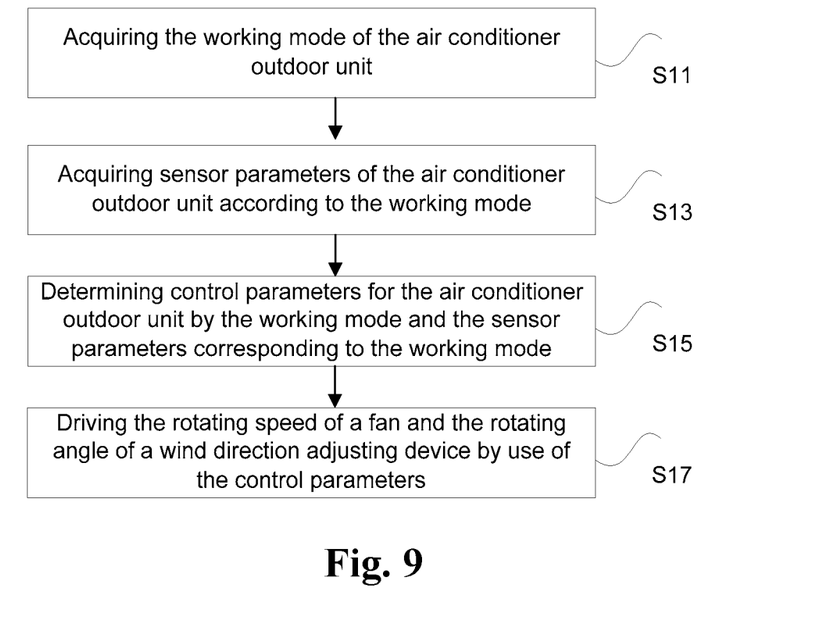
FIG. 9 is a flow chart of a method for controlling an air conditioner outdoor unit according to Example 2 of the present application.

FIG. 9 is a flow chart of a method for controlling an air conditioner outdoor unit according to an example of the present application. As shown in FIG. 9, the air conditioner outdoor unit comprises: a fan, a compressor, a wind direction adjusting device, at least one temperature sensor, a wind direction sensor and a controller, and the controller is connected with the fan, the compressor, the wind direction adjusting device, and the temperature sensor respectively. The method comprises steps as follows:

Step S11, acquiring a working mode of the air conditioner outdoor unit;

Step S13, acquiring sensor parameters of the air conditioner outdoor unit according to the working mode, wherein the sensor parameters include: wind direction parameters read by the wind direction sensor or temperature parameters read by the temperature sensor;

Step S15, determining control parameters for the air conditioner outdoor unit by the working mode and the sensor parameters corresponding to the working mode;

Step S17, driving a rotating speed of the fan and a rotating angle of the wind direction adjusting device using the control parameters.

In a solution of the above example of the present application, the sensor parameters corresponding to the working mode are collected according to the working mode of the air conditioner outdoor unit through the above Step S11 to Step S17, wherein the working mode at least includes a power consumption mode and a power generation mode.

When the air conditioner outdoor unit is in the power consumption mode, the controller reads a numerical value of temperature of the temperature sensor provided inside the air conditioner outdoor unit, and can control the air conditioner outdoor unit to adjust the rotating speed of the fan according to changes of an actual temperature inside the air conditioner. This not only satisfies requirements for heat dissipation, but also can achieve an object of saving energy and power.

When the air conditioner outdoor unit is in the power generation mode, the controller reads the wind direction parameters of the wind direction sensor provided outside the air conditioner outdoor unit, and can control the air conditioner outdoor unit to adjust the wind direction adjusting device according to an actual wind direction outside the air conditioner, so that air can exchange inside and outside the outdoor unit, thereby making use of flow of air as much as possible to drive the fan to rotate. Thus, the efficiency of generating power using the fan is improved.

Through the above example, a problem of a low utilization ratio of wind energy caused by the fact that a position of the fan of the air conditioner outdoor unit cannot be changed as required in the prior art is solved, and effects of adjusting an orientation of a vent of the air conditioner outdoor unit according to the wind direction and improving the utilization ratio of using the wind energy are reached.

Preferably, in the above example of the present application, when the working mode of the air conditioner outdoor unit is the power consumption mode, the sensor parameters of the air conditioner outdoor unit acquired according to the working mode are the temperature parameters, wherein the Step S15 of determining control parameters for the air conditioner outdoor unit by the working mode and the sensor parameters corresponding to the working mode comprises steps as follows:

Step S151a, determining a first control parameter for controlling the rotating speed of the fan by comparing an actual power value of the compressor with a rated power value of the compressor;

Step S153a, determining the first control parameter as a rated highest rotating speed of the fan when the actual power value is equal to the rated power;

Step S155a, determining the first control parameter as a calculated rotating speed value of the fan when the actual power value is less than the rated power value.

Thereinto, the Step S155a of determining the first control parameter as a calculated rotating speed value of the fan may comprise:

Step S1551a, calculating a power ratio in percentage of the actual power value of the compressor to the rated power value;

Step S1552a, calculating the rotating speed value according to the power ratio in percentage and the temperature parameters to obtain the calculated rotating speed value of the fan.

Specifically, the controller determines the first control parameter for controlling the rotating speed value of the fan by acquiring the actual power value of the compressor of the air conditioner outdoor unit and comparing the actual power value of the compressor with the rated power value of the compressor, so as to realize hierarchical control of the fan of the compressor.

In practical application, when the air conditioner outdoor unit works in the power consumption mode, the fan converter DC/AC works in an inversion state, and the fan rotates forwardly to perform heat dissipation for the air conditioner outdoor unit; when the compressor of the air conditioner works under a maximum load, the controller controls the fan to output a maximum heat dissipation capability in synchronization so as to provide a heat dissipation capability matched with module heat dissipation requirements at this moment.

When the compressor works under conditions of other loads, heat dissipation requirements of an inverter module of the compressor are different from requirements of the compressor) during operation at a rated power. The controller adjusts a rotating speed $\omega_f = f(T_{mod}, P_{com})$ of the fan according to an actual temperature value $T^{mod}$ read by the temperature sensor and a compressor working power $P_{com}$, so as to realize the matching of the heat dissipation capability output by the fan with the heat dissipation capability required by the inside of the air conditioner outdoor unit.

Further, the rotating speed of the fan can be adjusted through a calculation formula as follows:

$$\omega_f = K^*(a^*P_{com} + b^*\text{Table}(T_{mod}, P_{ref}));$$

wherein, a and b are weighted coefficients, which are variable values; $K = k_1 * \omega_n / P_n$, $\omega_n$ is the rated rotating speeds, $P^n$ is the rated power, $k_1$ is a weighted coefficient; Table $(T_{mod}, P_{ref})$ is a preset table (modifiable according to an empirical value) of temperatures and powers under different working conditions.

A power output of the fan is adjusted according to a temperature value obtained by reading the temperature sensor so that the power output of the fan is matched with the heat dissipation requirements of the temperature. When the temperature is relatively low, and when the temperature inside the air conditioner outdoor unit is relatively low, the rotating speed of the fan is adjusted to slow down; when the temperature inside the air conditioner outdoor unit is relatively high, the heat dissipation requirements inside the air conditioner outdoor unit are increased, the rotating speed of the fan is adjusted to become quick so as to reduce the consumption of energy while meeting the heat dissipation capability and realize hierarchical heat dissipation.

Through linkage control of the controller to the fan and the temperature inside the air conditioner outdoor unit, excessive consumption of the electrical energy caused by the fan, which keeps dissipating heat at maximum power, is prevented, meanwhile the service life of the fan also can be prolonged.

Preferably, in the above example of the present application, the air conditioner outdoor unit at least comprises two temperature sensors. The temperature sensors establish communication connection with the controller respectively, and the temperature sensors are mounted in different positions in the air conditioner outdoor unit, wherein the Step S17 of driving a rotating speed of the fan and a rotating angle of the wind direction adjusting device using the control parameters comprises steps as follows:

Step S171a, driving the rotating speed of the fan using the first control parameter;

Step S173a, comparing the actual temperature values of respective temperature sensors to acquire a position of the temperature sensor having a highest actual temperature value;

Step S175a, adjusting the rotating angle of the wind direction adjusting device according to the position of the temperature sensor having the highest temperature value.

Specifically, through the above Step S171a to Step S175a, in a situation that the controller controls the rotating speed of the fan of the air conditioner outdoor unit according to the actual temperature inside the air conditioner outdoor unit, by further comparing the actual temperature values of at least two temperature sensors provided in different positions inside the air conditioner outdoor unit, an area having a relatively high temperature inside the air conditioner outdoor unit is determined. By adjusting the rotating angle of the wind direction adjusting device, heat dissipation is realized preferentially in area with higher temperature inside the air conditioner outdoor unit.

In practical application, through the method of the above example, apart from performing the linkage control to the actual rotating speed of the fan and the temperature inside the air conditioner outdoor unit, the controller further performs linkage control to the rotating direction of the wind direction adjusting device and area with highest temperature in the air conditioner outdoor unit to adjust an angle of inlet/outlet wind of the fan in real time so that quick heat dissipation is performed for the inside of the air conditioner outdoor unit and actual temperatures of various areas are balanced.

When the temperature inside the air conditioner outdoor unit is unbalanced, a rotating angle value of the wind direction adjusting device is controlled by $\theta_f = f(T_{env\_max}, T_{env\_1}, \ldots, T_{env\_n})$, and a specific rotating angle value $\theta_f$ depends on a highest temperature point inside the air conditioner outdoor unit, wherein $T_{env\_1}, T_{env\_2}, \ldots, T_{env\_n}$ are actual temperatures of respective temperature sensors.

Further, when the temperature inside the air conditioner outdoor unit is unbalanced, the wind direction can be adjusted by a calculation formula as follows:

$$\theta_f = K^*\text{Table}(\text{coordinate}(T_{env\_max}), \theta_{ref});$$

wherein, K is a weighted coefficient, which is a variable value; $T_{env\_max} = \text{Max}(T_{env\_1}, T_{env\_2}, \ldots, T_{env\_n})$, $T_{env\_1}, T_{env\_2}, \ldots, T_{env\_n}$ are actual temperatures of respective temperature sensors; $\theta_{ref}$ is a fixed angle value, the fixed angle value is the numerical value of predetermined angle of respective position point with respect to the fan.

Through the above method, according to the detection by the existing temperature sensor inside the air conditioner outdoor unit, a highest point of the temperature inside the air conditioner outdoor unit is determined, and the angle of the fan is adjusted, so that a wind outlet point of the fan is matched with the position with the highest temperature point inside the air conditioner outdoor unit, and the effect of quick heat dissipation is achieved, meanwhile a temperature field inside the air conditioner outdoor unit is maintained relatively balanced.

Preferably, in the above example of the present application, the air conditioner outdoor unit further comprises: an energy storing unit, and the energy storing unit establishes a connection relationship with the air conditioner outdoor unit respectively, wherein prior to the Step S11 of acquiring a working mode of the air conditioner outdoor unit, the method further comprises:

Step S101, dividing each day at least into two time intervals;

Step S103, setting up power consumption solutions of the air conditioner outdoor unit according to the time intervals, wherein the power consumption solutions at least include: using electrical energy of a power grid, using electrical energy of the energy storing unit, and simultaneously using the electrical energy of the power grid and the energy storing unit.

Specifically, through the above Step S101 to Step S103, 24 hours of each day are divided, and they can be divided into several time intervals as required. According to characteristics of each time interval, the power consumption solutions corresponding to the time intervals are set up, wherein the power consumption solutions at least include: using the electrical energy of the power grid, using the electrical energy of the energy storing unit, and simultaneously using the electrical energy of the power grid and the energy storing unit.

Preferably, in the above example of the present application, after the Step S11 of acquiring a working mode of the air conditioner outdoor unit, the method further comprises:

Step S121, acquiring a current time;

Step S122, matching the current time with the time interval to obtain a matching result;

Step S123, determining the power consumption solution of the air conditioner outdoor unit according to the matching result.

Specifically, through the above Step S121 to Step S123, the current time is acquired, and the current time is matched with the preset time interval so as to determine the power consumption solution which should be used at current time.

In practical application, when remaining energy sources of the energy storing unit are relatively abundant, the power consumption solution can be adjusted according to the time interval so as to realize peak shifting and peak shaving operation and provide certain guarantee for the power grid security.

Preferably, in the above example of the present application, when the working mode of the air conditioner outdoor unit is the power generation mode, the sensor parameters of the air conditioner outdoor unit acquired according to the working mode are wind direction parameters, wherein the Step S15 of determining control parameters for the air conditioner outdoor unit by the working mode and the sensor parameters corresponding to the working mode comprises steps of:

Step S151b, determining a second control parameter for controlling the rotating angle of the wind direction adjusting device through the wind direction parameters.

Specifically, through the above Step S151b, the wind direction parameters of the air conditioner outdoor unit are read, and a rotating angle value by which the wind direction adjusting device needs to rotate is calculated according to the wind direction parameters, and the second control parameter for controlling the rotating angle of the adjusting device is generated according to the rotating angle value.

In practical application, a windward angle of the fan is adjusted according to the wind direction outside the air conditioner outdoor unit so that the fan angle is matched with the wind direction, and it is an optimal power generation angle, so as to improve the power generation efficiency of the fan.

Preferably, in the above example of the present application, the air conditioner outdoor unit further comprises an energy storing unit, and the energy storing unit establishes a connection relationship with the air conditioner outdoor unit respectively, wherein after the Step S151b of determining a second control parameter for controlling the rotating angle of the wind direction adjusting device through the wind direction parameters, the method further comprises:

Step S16, determining a strategy of power recovery by comparing a generated power of the fan with a preset power threshold.

Specifically, through the above Step S16, the generated power of the fan is read by the controller, and the read generated power of the fan is compared with the preset power threshold, so that the strategy of power recovery is adjusted according to the generated power of the fan, to realize maximum utilization of the recovered energy sources.

Preferably, in the above example of the present application, when the power threshold includes a first power threshold and a second power threshold, the first power threshold is less than the second power threshold, wherein the Step S16 of determining a strategy of power recovery by comparing a generated power of the fan in the power generation mode with a preset power threshold comprises any one or more implementations:

Implementation 1: judging whether the generated power is less than or equal to the first power threshold, wherein in a situation that the generated power is less than or equal to the first power threshold, the electrical energy generated by the air conditioner outdoor unit is stored in the energy storing unit.

Implementation 2: judging whether the generated power is greater than the first power threshold and less than or equal to the second power threshold, wherein when the generated power is greater than the first power threshold and less than or equal to the second power threshold, the electrical energy generated by the air conditioner outdoor unit is output to the power grid after being processed.

Implementation 3: judging whether the generated power is greater than the second power threshold, wherein when the generated power is greater than the second power threshold, the electrical energy generated by the air conditioner outdoor unit is directly output to the power grid.

In practical application, when the air conditioner outdoor unit works in the power generation mode, the fan rotates reversely to generate power, the fan converter performs rectification (when the fan converter is a quadrant converter, the fan converter works in a rectification state) with a freewheel diode to obtain direct current, and the energy generated by the power generation through the reverse rotation of the fan can be hierarchically recovered in several manners as follows:

when the energy of the reverse rotation of the fan is less than a preset threshold, the energy charges the energy storing unit by the Direct Current-to-Direct Current (DC/DC) converter used for voltage stabilization in an energy storing step, to recycle the reverse energy in a storing way;

when the energy of the reverse rotation of the fan is greater than the preset threshold, it means that the energy generated by the power generation of the fan achieves a grid-connected condition, and grid connection is performed through the grid-connected converter and the isolation transformer (the isolation transformer can be optionally mounted according to a degree of stability of electrical energy conversion) for use by other loads in the power grid;

when the energy generated by the reverse rotation of the fan gets close to the grid-connected condition, recovery and grid connection are performed on the energy in a boosting manner or by a staggered modulation technology.

By comparing the generated power with the preset threshold, when power and voltage of wind power generation are less than the preset thresholds, the fan rotates reversely to generate power, and reversely rectifies the electrical energy it generates through a direct current/alternating current (DC/AC) converter of the fan itself of the air conditioner outdoor unit to obtain the direct current, and then charges the energy storing unit, improving the energy recovery rate of the reverse energy generation of the fan; at the same time, the energy storing unit can release energy to the direct current bus of the air conditioner when needed by the air conditioner, and the energy is converted by the compressor converter for use by the air conditioner, improving a direct utilization ratio of the energy of the power generated by the fan.

When the power and voltage of wind power generation are greater than certain set thresholds, and when the energy of the power generated through the reverse rotation of the fan facilitates the grid connection (when a boosting step is not needed or a capacity of the boosting step is relatively small), the power generated through the reverse rotation of the fan is reversely rectified by the DC/AC converter of a driving portion of the fan itself outside the air conditioner to obtain the direct current, which is combined to the direct current bus of the air conditioner, and fed back to the power grid through the grid-connected converter DC/AC to be used by other loads in the network, thus reducing a power picking amount from a mains supply, reducing a load of the power grid, and ensuring security of the power grid.

Preferably, in the above example of the present application, prior to the Step S16 of determining a strategy of power recovery by comparing a generated power of the fan in the power generation mode with a preset power threshold, the method further comprises:

Step S1601, acquiring an energy value of the energy storing unit;

Step S1602, charging the energy storing module when the energy value is less than or equal to a preset threshold.

Specifically, through the Step S1601 to Step S1602, in the power generation mode, prior to determining the strategy of power recovery, the energy value in the energy storing unit can be firstly judged. When the energy value in the energy storing unit is less than the preset threshold, the energy storing unit is preferably charged so as to ensure a sufficient amount of power in the energy storing unit.

In practice, when the air conditioner outdoor unit works in the power consumption mode, firstly it is ensured that the energy storing unit has a sufficient amount of power, then when the power grid is in a period of peak load operation, the energy storing unit can preferentially release the stored energy to the direct current bus of the air conditioner, and then the power is supplied through the compressor converter so as to achieve peak shifting and peak shaving operation, meanwhile the direct utilization ratio of the energy of the reverse rotation of the fan is improved.

The method for controlling the air conditioner outdoor unit put forward in the above example improves the efficiency of converting the wind energy into the electrical energy with the structure staying as much unchanged as possible, meanwhile during the heat dissipation for the air conditioner, the rotation speed of the fan is linked with the actual temperature inside the air conditioner outdoor unit for heat dissipation, reducing the energy consumption in the power consumption mode.

It should be indicated that for the respective preceding example of method, for the sake of simple description, all of them are described as combinations of a series of actions, but a person skilled in the art should know that the present application is not limited to the described action sequence, because according to the present application, certain steps can be performed in other orders or at the same time. Secondly, a person skilled in the art also should know that all of the examples described in the description are preferable examples, and the actions and modules involved are not necessarily indispensable for the present application.

In the above examples, the description of respective examples has different emphases, and for a part which is not described in detail in a certain example, reference can be made to relevant description in other examples.

In the several examples provided in the present application, it should be understood that the disclosed device can be realized in other ways. For example, the examples for device described above are merely illustrative, for example, the division of the said units is merely a type of division of logical functions, but there may be other way of division in practical implementation, for example, a plurality of units or assemblies can be combined with or integrated into another system, or some features can be omitted, or not executed. Another point is that the displayed or discussed mutual coupling or direct coupling or communication connection can be realized through some interfaces, and indirect coupling or communication connection of the apparatus or unit can be in an electrical form or other forms.

The said units described as separate parts can be or also may not be physically separated, the parts displayed as units can be or also may not be physical units, i.e., they can be located at one place, or also can be distributed on a plurality of network units. The object of the solution of the present example can be realized by selecting part or all of the units thereof as actually required.

Besides, various functional units in respective examples of the present application can be integrated into one processing unit, or various units also can exist in a physically independent way, and two or more than two units also can be integrated into one unit. The unit integrated above can be realized in a hardware form, and also can be realized in a form of software functional unit.

If the said integrated unit is realized in a form of software functional unit and is sold or used as an individual product, it can be stored in one computer readable storage medium. Based on such understanding, the technical solution of the present application essentially or the part making contribution to the prior art or all or part of this technical solution can be embodied in a form of software product, and this computer software product is stored in one storage medium, including several commands used to make one computer device (which can be a personal computer, a mobile terminal, a sever or a network device etc.) execute all or part of the steps of the said methods of various examples of the present application. The aforementioned storage medium includes various medium that can store program codes, such as U disk, Read-Only Memory (ROM), Random Access Memory (RAM), mobile hard disk, diskette or compact disk and so on.

The above are merely preferable examples of the present application and are not used to limit the present application. For a person skilled in the art, various modifications and changes may be made to the present application. Any amendments, equivalent replacements, improvements and so on, without departing from the spirit and principle of the present application, should be covered by the protection scope of the present application.

The invention claimed is:

1. A method for controlling an air conditioner outdoor unit, wherein said air conditioner outdoor unit comprises: a fan, a compressor, a wind direction adjusting device, at least one temperature sensor, a wind direction sensor, and a controller, said controller is connected with said fan, said compressor, said wind direction adjusting device, and said temperature sensor, said method comprising:
A. acquiring a working mode of the air conditioner outdoor unit, wherein when the working mode is a power consumption mode of the air conditioner outdoor unit, the fan rotates in a first direction to drive a first air flow for performing heat dissipation of the air conditioner outdoor unit; and when the working mode is a power generation mode, a second air flow drives the fan rotate in a second direction reverse to the first direction to generate power;
B. acquiring sensor parameters of said air conditioner outdoor unit according to said working mode, wherein said sensor parameters include: wind direction parameters read by said wind direction sensor or temperature parameters read by said temperature sensor;
C. determining control parameters for said air conditioner outdoor unit by said working mode and said sensor parameters corresponding to said working mode; and
D. driving a rotating speed of said fan and a rotating angle of said wind direction adjusting device using said control parameters, wherein the wind direction adjusting device is a wind direction deflector installed inside the fan, a wind deflector installed outside the fan, or a pair of rotation shafts installed in a vertical direction and a horizontal direction of the fan, respectively.

2. The method according to claim 1, wherein when said working mode of said air conditioner outdoor unit is the power consumption mode, the sensor parameters are said temperature parameters, wherein step C comprises:
determining a first control parameter for controlling the rotating speed of said fan by comparing an actual power value of said compressor with a rated power value of said compressor;
when said actual power value is determined to be equal to the rated power value, setting said first control parameter as a rated highest rotating speed of said fan;
when said actual power value is less than the rated power value, setting said first control parameter as a calculated rotating speed value of said fan, which comprises:

calculating a power ratio in percentage of said actual power value of said compressor to said rated power value; and
calculating a rotating speed value according to said power ratio in percentage and said temperature parameters to obtain the calculated rotating speed value of said fan.

3. The method according to claim 2, wherein said air conditioner outdoor unit at least comprises two said temperature sensors, said temperature sensors respectively establish communication connection with said controller, and said temperature sensors are mounted in different positions in said air conditioner outdoor unit, wherein step D comprises:
driving the rotating speed of said fan using said first control parameter;
comparing actual temperature values of the temperature sensors to locate a position where one of said temperature sensors having a highest said actual temperature value; and
adjusting said rotating angle of said wind direction adjusting device according to the position of said temperature sensor having the highest said temperature value.

4. The method according to claim 2, wherein said air conditioner outdoor unit further comprises: an energy storing unit, wherein prior to step A, said method further comprises:
dividing each day at least into two time intervals; and
setting up power consumption solutions of said air conditioner outdoor unit according to said time intervals, wherein said power consumption solutions at least include: using electrical energy of a power grid, using electrical energy of the energy storing unit, and simultaneously using the electrical energy of said power grid and said energy storing unit, wherein said energy storing unit comprises an electrical interface for being connected to a direct current bus of said air conditioner outdoor unit, and is a device that stores a first electrical energy generated by the air conditioner outdoor unit or discharges a second electrical energy to the direct current bus of said air conditioner outdoor unit.

5. The method according to claim 4, wherein after step A, said method further comprises:
acquiring a current time;
matching said current time with said time interval to obtain a matching result; and
determining said power consumption solution of said air conditioner outdoor unit according to said matching result.

6. The method according to claim 1, wherein when said working mode of said air conditioner outdoor unit is a power generation mode, the sensor parameters of said air conditioner outdoor unit acquired according to said working mode are said wind direction parameters, wherein step C comprises:
determining a second control parameter for controlling the rotating angle of said wind direction adjusting device through said wind direction parameters.

7. The method according to claim 6, wherein said air conditioner outdoor unit further comprises an energy storing unit, wherein said energy storing unit comprises an electrical interface for being connected to a direct current bus of said air conditioner outdoor unit, and is a device that stores a first electrical energy generated by the air conditioner outdoor unit or discharges a second electrical energy to the direct current bus of said air conditioner outdoor unit, wherein after determining the second control parameter for controlling the rotating angle of said wind direction adjusting device through said wind direction parameters, said method further comprises:

determining a strategy of power recovery by comparing a generated power of said fan with a preset power threshold.

8. The method according to claim 7, wherein when said power threshold includes a first power threshold and a second power threshold and said first power threshold is less than said second power threshold, the step of determining a strategy of power recovery by comparing a generated power of said fan in said power generation mode with a preset power threshold comprises Implementation 1, Implement 2, and Implementation 3, wherein Implementation 1 comprises judging whether said generated power is less than or equal to said first power threshold, wherein in a situation that the generated power is less than or equal to the first power threshold, electrical energy generated by said air conditioner outdoor unit is stored in the energy storing unit;

wherein Implementation 2 comprises judging whether said the generated power is greater than said first power threshold and less than or equal to said second power threshold, wherein when said the generated power is greater than said first power threshold and less than or equal to said second power threshold, the electrical energy generated by said air conditioner outdoor unit is output to a power grid after being processed; and wherein Implementation 3 comprises judging whether said the generated power is greater than said second power threshold, when said the generated power is greater than said second power threshold, the electrical energy generated by said air conditioner outdoor unit is directly output to said power grid.

9. The method according to claim 7, wherein prior to the step of determining a strategy of power recovery by comparing a generated power of said fan in said power generation mode with a preset power threshold, the method further comprises:

acquiring an energy value of said energy storing unit; and charging the energy storing unit when said energy value is less than or equal to a preset threshold.

10. A system for controlling an air conditioner outdoor unit, wherein said system comprises:

an energy source conversion device for performing conversion between an alternating current and a direct current, wherein the energy source conversion device comprises a transformer and a convertor;

a fan device connected with said energy source conversion device through a direct current bus;

a compressor device connected with said energy source conversion device through said direct current bus;

a sensor for sensing a sensor parameter of the air conditioner outdoor unit;

a controller having communication connection respectively with said energy source conversion device, said fan device, said compressor device, and said sensor, wherein the controller acquires a working mode of the air conditioner outdoor unit, wherein when the working mode is a power consumption mode of the air conditioner outdoor unit, the fan rotates in a first direction to drive a first air flow for performing heat dissipation of the air conditioner outdoor unit; and when the working mode is a power generation mode, a second air flow drives the fan rotate in a second direction reverse to the first direction to generate power;

and wherein the controller further acquires the sensor parameters of said air conditioner outdoor unit according to said working mode, after determining control parameters for said air conditioner outdoor unit by said working mode and said sensor parameters corresponding to said working mode, drives a rotating speed of the fan device and a rotating angle of a wind direction adjusting device using said control parameters, wherein the wind direction adjusting device is a wind direction deflector installed inside the fan, a wind deflector installed outside the fan, or a pair of rotation shafts installed in a vertical direction and a horizontal direction of the fan, respectively.

11. The system according to claim 10, wherein in said energy source conversion device said transformer is an isolation transformer that connects with a power grid, and the converter is a grid-connected converter that connects with said direct current bus and said isolation transformer.

12. The system according to claim 10, wherein said fan device comprises:

a fan; a fan converter; and the wind direction adjusting device.

13. The system according to claim 12, wherein said sensor comprises:

at least one temperature sensor that is mounted inside said air conditioner outdoor unit, connects with said controller, and reads a temperature value inside said air conditioner outdoor unit.

14. The system according to claim 10, wherein said sensor comprises:

a wind direction sensor that is mounted outside said air conditioner outdoor unit, connects with said controller, and acquires wind direction information.

15. The system according to claim 14, wherein said system further comprises:

an energy storing unit, wherein said energy storing unit comprises an electrical interface for being connected to a direct current bus of said air conditioner outdoor unit and is a device that stores a first electrical energy generated by the air conditioner outdoor unit or discharges a second electrical energy to the direct current bus of said air conditioner outdoor unit.

16. The system according to claim 15, wherein said system further comprises:

a renewable energy source connecting with said direct current bus.

17. The system according to claim 16, wherein said renewable energy source device comprises any one or more devices as follows: a photovoltaic power generator, a geothermal power generator, a bioenergy power generator, and a tidal power generator.

18. The system according to claim 17, wherein said system further comprises: a direct current distributor that connects respectively with said energy source conversion device, said fan device, said compressor device, said renewable energy source device, said energy storing unit and said controller, and said direct current distributor generates energy source distribution instructions for said fan device and said compressor device according to control instructions of said controller.

* * * * *